United States Patent [19]
Oshikiri

[11] Patent Number: 5,996,053
[45] Date of Patent: Nov. 30, 1999

[54] METHOD AND APPARATUS FOR FETCHING CLASSIFIED AND STORED INFORMATION

[75] Inventor: Minoru Oshikiri, Hamamatsu, Japan

[73] Assignee: Yamaha Corporation, Hamamatsu, Japan

[21] Appl. No.: 08/782,544

[22] Filed: Jan. 10, 1997

[30] Foreign Application Priority Data

Jan. 11, 1996 [JP] Japan .................................. 8-020461

[51] Int. Cl.$^6$ ...................................................... G06F 12/00
[52] U.S. Cl. .......................... 711/158; 711/157; 707/200; 707/3; 345/508; 371/51.1
[58] Field of Search ............................... 707/200, 3, 101; 345/508; 371/51.1; 711/157, 158

[56] References Cited

U.S. PATENT DOCUMENTS

| | | | |
|---|---|---|---|
| 4,430,701 | 2/1984 | Christian et al. | 711/119 |
| 4,533,995 | 8/1985 | Christian et al. | 711/122 |
| 4,583,166 | 4/1986 | Hartung et al. | 711/113 |
| 4,633,387 | 12/1986 | Hartung et al. | 395/675 |
| 4,636,946 | 1/1987 | Hartung et al. | 711/136 |

OTHER PUBLICATIONS

Oshikiri, M., et al., "Integrated Cell Library Data Base YILD", Information Processing Society of Japan, Feb. 22, 1989, pp. 41–48 (Translation of Abstract only).

*Primary Examiner*—John W. Cabeca
*Assistant Examiner*—Mehdi Namazi
*Attorney, Agent, or Firm*—Pillsbury Madison & Sutro LLP

[57] ABSTRACT

A method for selectively fetching a piece of reference information that is stored in a storage location with a highest priority that is determined beforehand if plural pieces of reference information that have an identical name exist, wherein plural pieces of reference information are classified and stored in a plurality of different storage locations, is provided according to the present invention, which comprises, generating an index table that indicates a relationship between each name of plural pieces of reference information and a storage location with a highest priority among a plurality of different storage locations for plural pieces of reference information that have a same name, searching for a storage location of a piece of reference information that should be fetched in the index table, and fetching the piece of reference information in a found storage location according to the searching. Apparatus for selectively fetching a piece of reference information is also provided according to the present invention, which comprises a generating portion for generating an index table that indicates a relationship between each name of plural pieces of reference information and a storage location with a highest priority among a plurality of different storage locations for plural pieces of reference information that have a same name, a searching portion for searching for a storage location of a piece of reference information that should be fetched in the index table, and a fetching portion for fetching the piece of reference information at a found storage location according to the search.

6 Claims, 8 Drawing Sheets

INDEX TABLE

| RECORD NUMBER | CELL NAME | DIRECTORY NAME |
|---|---|---|
| 1 | AND2 | BB |
| 2 | AND3 | AA |
| 3 | AND4 | CC |
| 4 | NOT | AA |
| 5 | OR2 | AA |
| 6 | OR3 | BB |
| 7 | OR4 | AA |

BLOCK

INDEX LIST

INDEX LIST

INDEX LIST

| PRIORITY TABLE | | |
|---|---|---|
| PRIORITY | STORING POSITION | |
| 1 | AA | |
| 2 | BB | |
| 3 | CC | |

METHOD AND APPARATUS FOR FETCHING CLASSIFIED AND STORED INFORMATION

BACKGROUND OF THE INVENTION

1. Field of the Invention

The present invention relates to methods and apparatuses for fetching reference information. More specifically, the present invention relates to methods and apparatuses for fetching, at high speeds, reference information that is classified and stored in a plurality of storage locations according to predetermined priorities.

2. Description of the Prior Art

In a logic simulator, which is one of the design tools for LSI, a plurality of pieces of cell information is stored in a file format in disk storage, each of which describes a logic model of each cell that is a basic element for various circuits, and a simulation is executed while fetching required pieces among the cell information from the disk storage. Each file, which is a unit for reference information and represents each cell, is classified and stored in one of plural data storage locations (directories) in the disk storage. Since a cell information group, which comprises plural pieces of cell information, is usually stored in one directory, plural pieces of cell information that have an identical file name do not exist in more than two directories. However, for example, when a cell information group that is developed for a specific user is managed in a separate directory, or when a part of cell information is changed with regard to internal property data and is then copied to another directory with a same name, plural files of the same name will overlap and exist in two or more different directories.

FIG. 11 shows such an example as described above. There are three directories AA, BB, and CC in disk storage, and plural pieces of cell information, such as AND3, NOT, etc., are stored separately in a file format in these directories AA, BB, and CC. Hereinafter, AND3, OR2, etc., are fetched as cell names. The cell information whose name is OR2, OR3, AND3, or NOT overlaps and exists in plural directories. In this case, for the cell information that simultaneously exists in plural directories with the same cell name, it is necessary beforehand to determine a priority order for each directory that has the same cell information to be fetched in order to prevent duplicate fetching of identical cell information.

For example, in the above-mentioned example, the priority order for the directories is determined as AA>BB>CC, and each cell information should be fetched according to the following access conditions.

Although OR2 exists in AA and BB, OR2 of AA should be accessed.

Although OR3 exists in BB and CC, OR3 of BB should be accessed.

Although AND3 exists in AA and CC, AND3 of AA should be accessed.

Although NOT exists in AA, BB, and CC, NOT of AA should be accessed.

Since OR4 exists only in AA, it should be accessed.

Since AND2 exists only in BB, it should be accessed.

Since AND4 exists only in CC, it should be accessed.

According to conventional methods, a priority table as shown in FIG. 12 should be prepared beforehand in order to realize such access. As shown in FIG. 13, whenever there is an access request (S41), each directory is searched one by one, based on this table (S42–S44), and when the cell information of a target cell name is found, the retrieval of the cell information is terminated (S45–S48).

However, according to such a method, because it is necessary to search, in order, for two or more information storage locations (directories), when there are many cases to refer to and many storage locations, there will be a problem in that the process takes considerable time.

This invention was made in view of such a problem, and it is an object of the present invention to provide methods and apparatuses for fetching information that is classified and stored, which can shorten the time required when a series of fetching operations is carried out.

SUMMARY OF THE INVENTION

According to an aspect of the present invention, a method is provided for selectively fetching a piece of reference information that is stored in a storage location with a highest priority that is determined beforehand if plural pieces of reference information that have an identical name exist, wherein plural pieces of reference information are classified and stored in a plurality of different storage locations, which comprises, generating an index table that indicates a relationship between each name of plural pieces of reference information and a storage location with a highest priority that is determined beforehand from among a plurality of different storage locations for plural pieces of reference information that have the same name, searching for a storage location of a piece of reference information that should be fetched in the index table, and fetching the piece of reference information in a found storage location according to the search.

According to another aspect of the present invention, apparatus is provided for selectively fetching a piece of reference information that is stored in a storage location with a highest priority that is determined beforehand if plural pieces of reference information that have an identical name exist, wherein plural pieces of reference information are classified and stored in a plurality of different storage locations, which comprises a portion for generating an index table that indicates a relationship between each name of plural pieces of reference information and a storage location with a highest priority that is determined beforehand from among a plurality of different storage locations for plural pieces of reference information that have a same name, a portion for searching for a storage location of a piece of reference information that should be fetched in the index table, and a portion for fetching the piece of reference information at a found storage location according to the search.

Here, a "storage location" means a directory or a page, which is made on external storage, such as a storage device, typically, a hard-disk device, and a CD drive device, etc., and in a system which is equipped with two or more sets of disk devices, and the disk device of each number, etc., corresponds to a storage location. Moreover, reference information is a unit of information that can be fetched, and a file, an information cell, etc., typically correspond to the reference information.

According to the present invention, an index table that indicates a relationship between each name of plural pieces of reference information and a storage location with a highest priority is generated beforehand, and a storage location of a piece of reference information to be fetched is searched for in the index table, and the piece of reference information in that obtained storage location is fetched. Therefore, it is only necessary once, at the time of generating an index table, to make a decision as to which piece of reference information should be chosen among plural pieces of reference information of an identical name, which overlap and exist in two or more storage locations. Hence, since a storage location of reference information can be immediately indicated by searching the index table, fetching process-time can be substantially reduced.

DESCRIPTION OF THE PREFERRED EMBODIMENTS

Figures 1, 3:
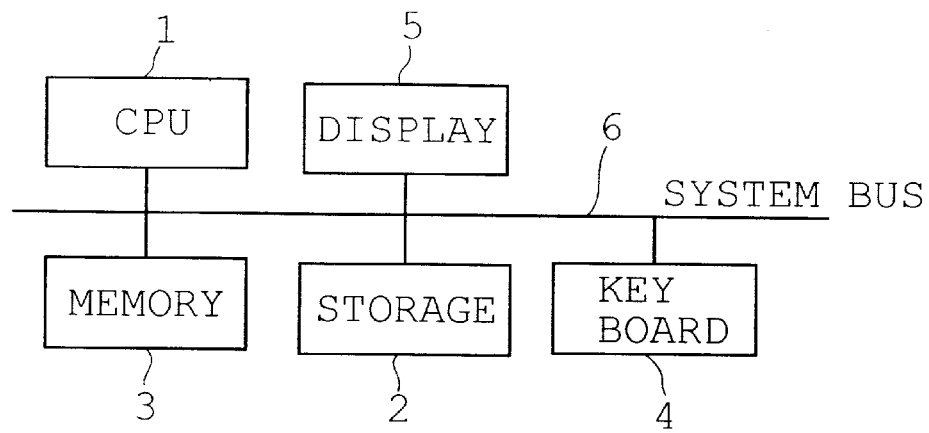
FIG. 1 is a block diagram of a system to which this invention can be applied.
FIG. 3 shows an index table used by the system shown in FIG. 2.

Hereafter, with reference to the drawings, preferred embodiments of the present invention will be described. FIG. 1 is a block diagram that shows a configuration of a system to which a data fetching method according to the present invention may be applied. This system consists of a workstation that can realize a logic simulator for LSI. It comprises of a CPU 1 as a main processing unit to control operation thereof, disk storage 2 as external storage in which logic models of cells that are respective basic elements of circuits are stored in a file format, memory 3 that provides a working area for processing in CPU 1, keyboard 4 for inputting information required for this system, and display 5 for displaying. These devices are mutually connected through a system bus 6.

Figure 2:
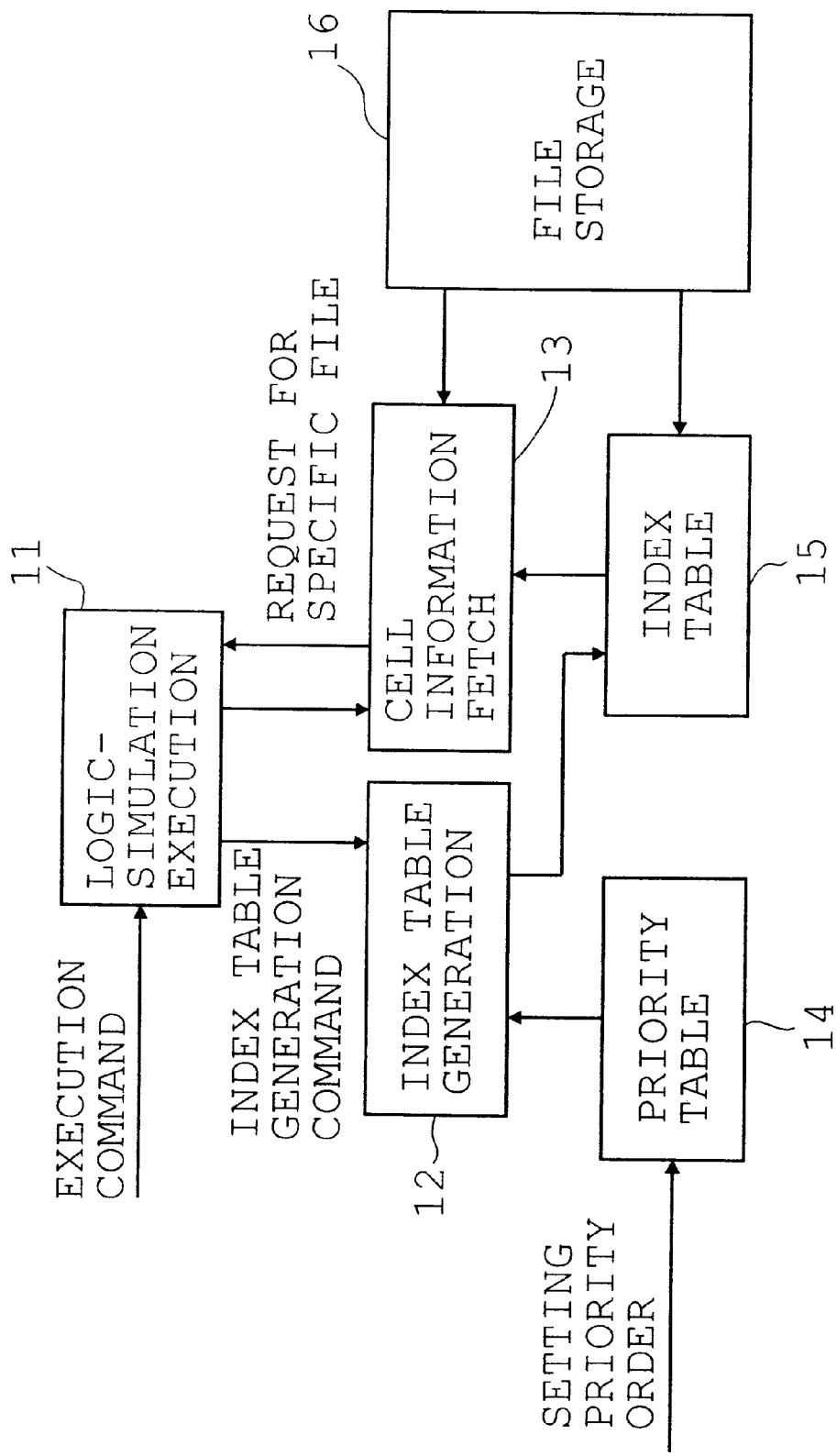
FIG. 2 is a functional-block diagram of a logic simulator that can be realized in the system shown in FIG. 1 according to the present invention.

FIG. 2 is a functional-block diagram of a logic simulator that can be realized by this system in FIG. 1. Logic-simulation execution block 11 is started by execution command, and starts operation of index table generation block 12 and cell information fetch block 13, separately at the required timing. Each of these blocks may be realized by CPU 1 with the necessary software. Index table generation block 12 generates an index table 15 based on a priority table 14. These tables are generated, for example, on memory 3 or disk storage 2. When an access request is generated for a specific cell from logic-simulation execution block 11, cell information fetch 13 finds a storage location of the cell information to be fetched based on the index table 15, and provides logic-simulation execution block 11 with the required cell information obtained from a corresponding storage location in file storage device 16 (disk storage 2).

Figures 11, 12:
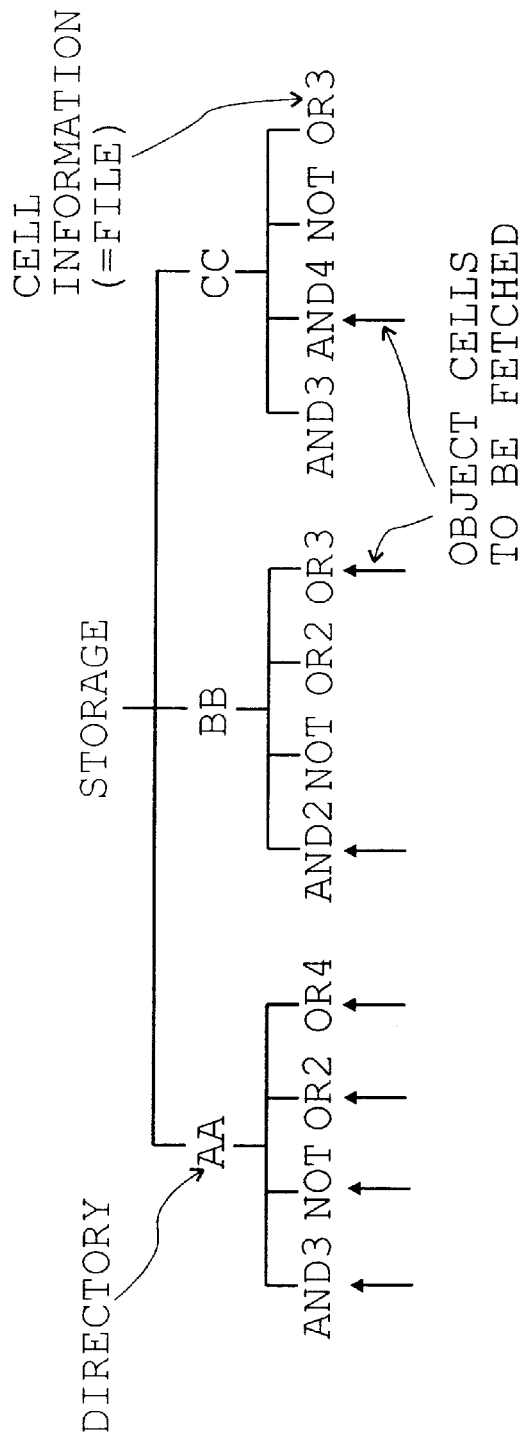
FIG. 11 shows an example of a storage state of cell information in storage.
FIG. 12 shows an example of a priority table that defines priority for accessing each storage location.
Figure 13:
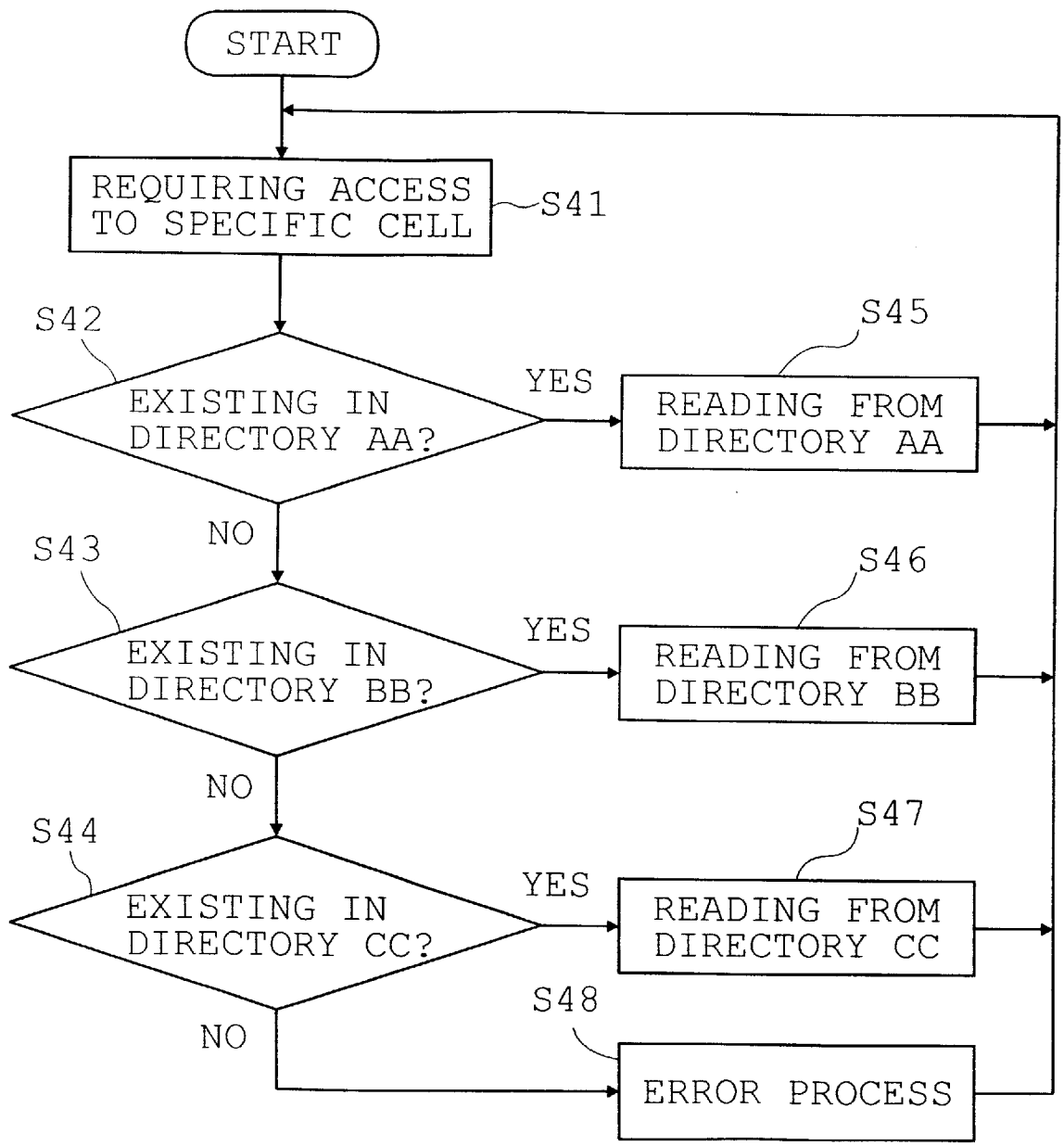
FIG. 13 is a flow chart that shows a conventional method for fetching cell information.

File storage device 16 may be partitioned into three directories AA, BB, and CC as shown in FIG. 11. In this case, plural pieces of cell information, which have respective cell names (file names), such as AND3, NOT, OR2, etc., are stored in these directories AA, BB, and CC, respectively, in a file format. These pieces of cell information will be fetched one by one at the time when logic simulation is executed.

For example, if there are seven pieces of cell information that should be fetched at the time of executing logic simulation, which are respectively named AND3, NOT, OR2, OR4, AND2, OR3, and AND4 and are marked with arrows in FIG. 11, and the cell information of AND3, NOT, OR2, and OR3 exists in different directories, it is necessary to decide beforehand which information should be fetched.

Then, an index table is generated based on a priority table as shown in FIG. 12, and cell information is fetched based on this index table in this system. An example of an index table is shown in FIG. 3. The index table consists of a record number, a cell name of cell information that should be fetched, and a directory name in which the cell information is stored. For example, when fetching cell information named AND3, it becomes immediately clear that the cell information that is stored in directory AA should be fetched according to this index table when fetching operation is executed, although the cell information named AND3 exists in directories AA and CC. Therefore, fetching operation may be accelerated.

Figure 4:
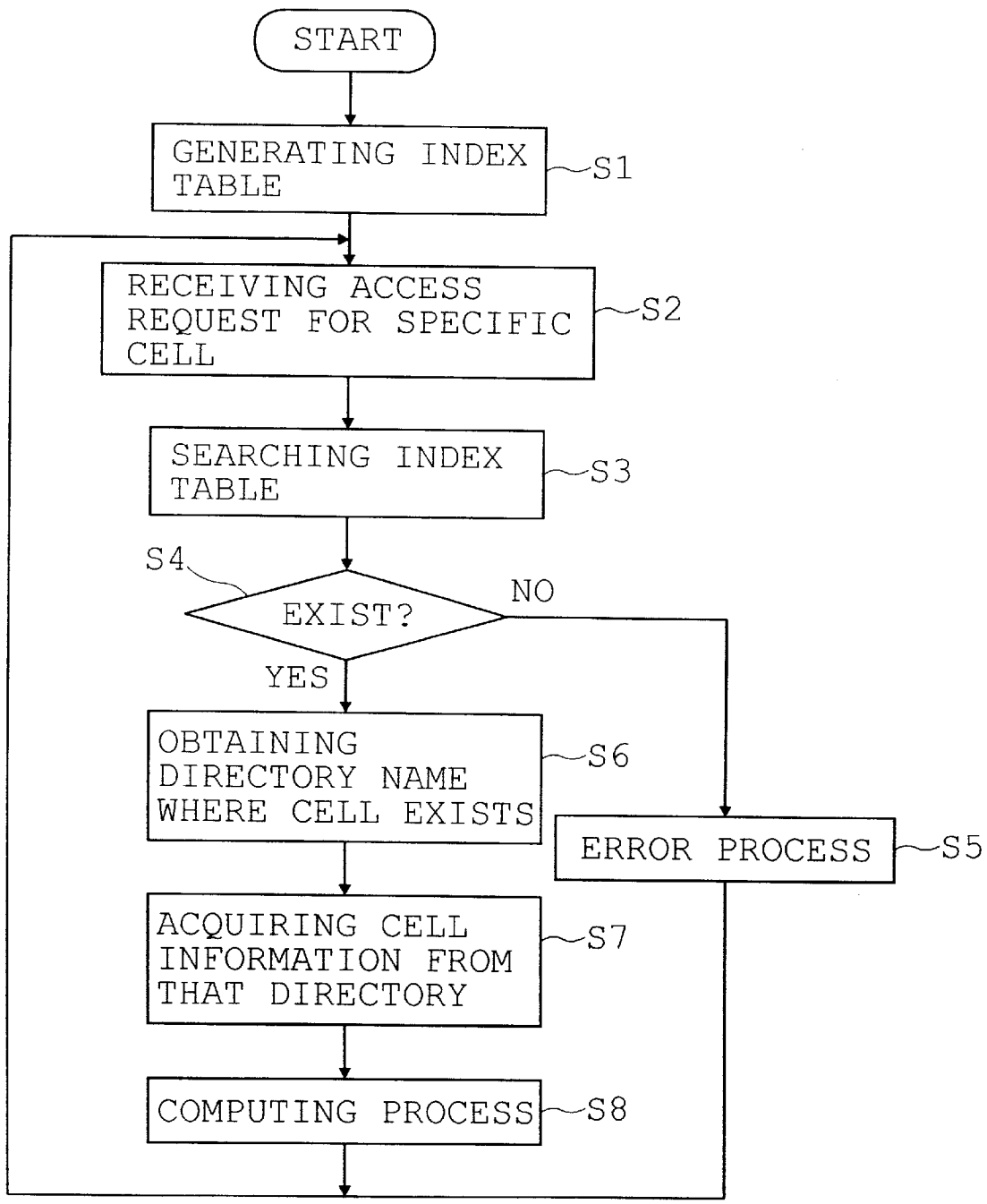
FIG. 4 is a flow chart that shows a cell information fetch procedure according to the present invention.

FIG. 4 is a flow chart that shows a process for fetching cell information, which can be executed by the system shown in FIG. 2. If an index generation command is given to index table generation block 12 from logic-simulation execution block 11, generation process of an index table is started and an index table as shown in FIG. 3 will be generated (S1). Next, if there is an access request for a specific cell from logic-simulation execution block 11 (S2), a step for searching the index table will be started (S3). If there is no cell information that has the name corresponding to the access request in the index table, an error process is executed (S4, S5), and if the corresponding cell name exists, the corresponding storage directory name is obtained (S6), the cell information of the cell name is acquired from this storage directory (S7), and required operation processing is executed (S8).

Figure 5:
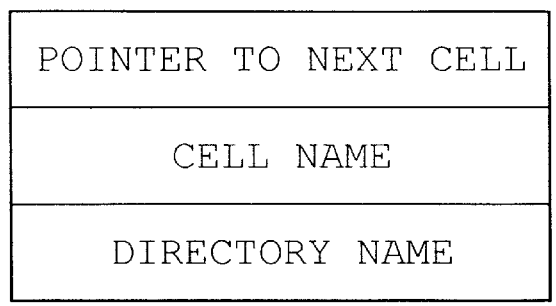
FIG. 5 shows a block configuration of an index list used by the system in FIG. 2.

An index table may be generated as follows. First of all, an index list is generated during a generation process of an index table. An index list consists of blocks that represent cells, respectively, as shown in FIG. 5. A block of the index list consists of a pointer for the succeeding cell, a cell name thereof, and a directory name thereof.

Figure 6:
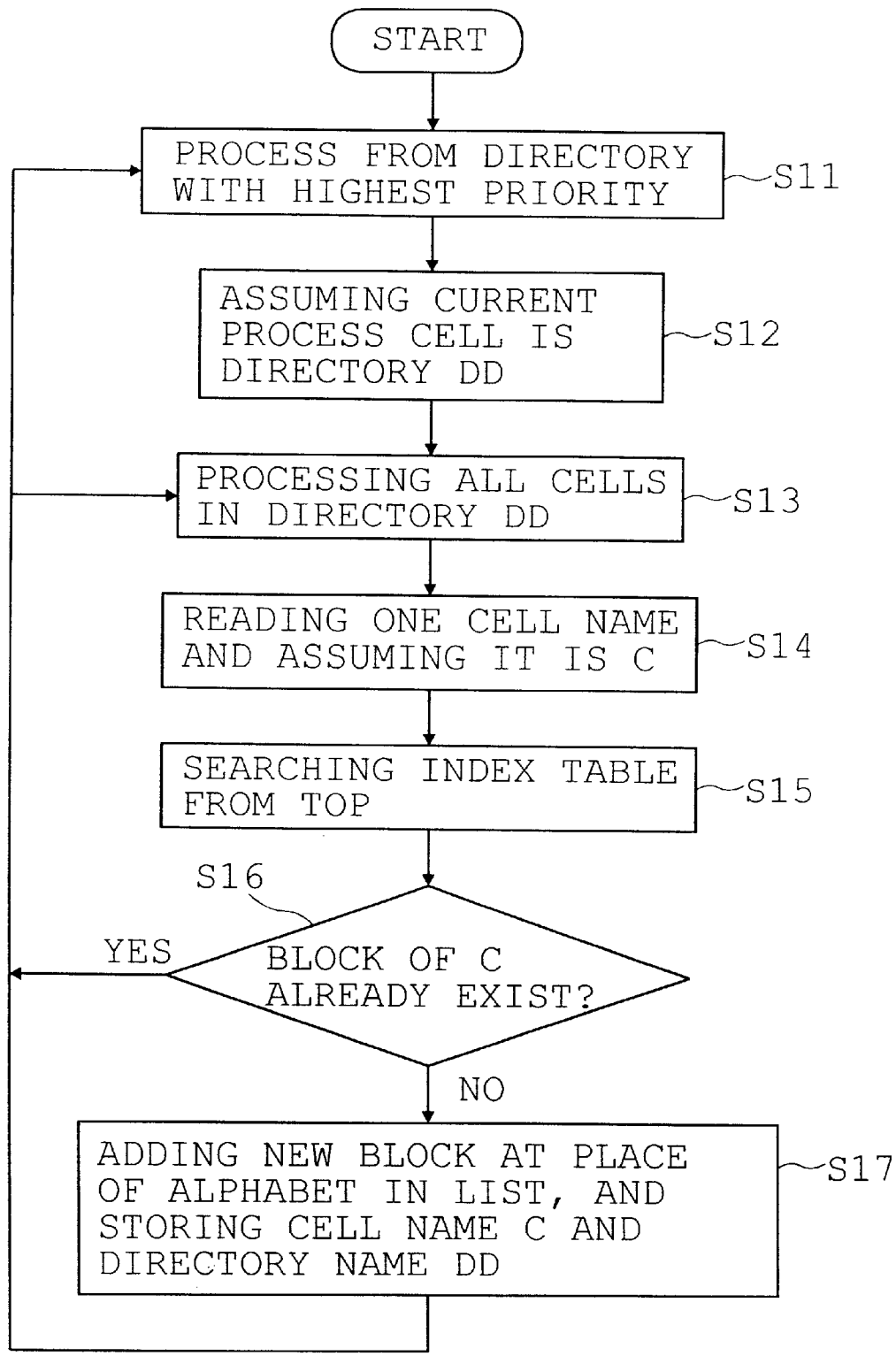
FIG. 6 is a flow chart that shows a generating process of an index list.

FIG. 6 shows a flow chart of index list generation processing. Based on the priority table that is mentioned above, the following processing is executed in order from a directory with the highest priority (S11). Assuming that a directory under present processing is DD (S12), the following processing will be executed for all the cell information in the directory DD (S13). First of all, one cell name is read and this cell is assumed to have name C (S14). While searching the index list sequentially from its top (S15), it is determined whether a block that has name C already exists (S16). The process returns to step S13 and continues with the next cell name when that cell name already exists, but when that cell name does not exist, a block with that cell name is added into the index list (S17). In this case, the insertion place of that block is determined so that the cell name thereof is arranged in alphabetical order in the index list. Namely, if blocks B and D are in the relation B<D, and are continuously arranged, when block C is newly added, a location that fulfills a condition of . . . <B<C<D<. . . is searched for, and a new block is generated, and then a new blank block is inserted into the index list and the cell name C and the directory name DD are stored in the new block.

Figure 7:
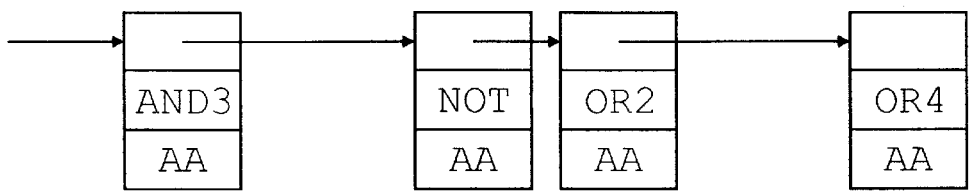
FIG. 7 shows a step of the generating process of an index list.
Figure 8:
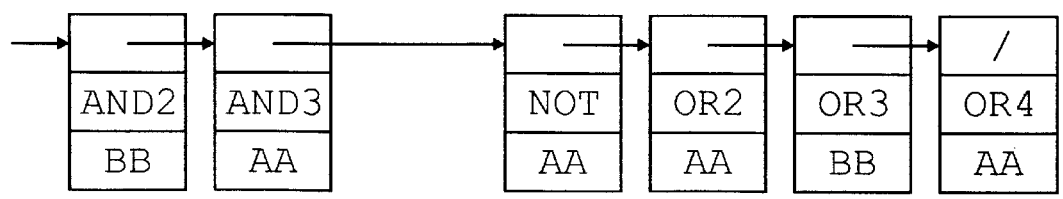
FIG. 8 shows the next step of the generating process of an index list.

Next, a more detailed example will be explained. When file storage 16 has the directory structure as shown in FIG. 11 and the order of the priority is defined as shown in FIG. 12, the processing starts from the directory AA that has the highest priority. The state where the cells (AND3, NOT, OR2, OR4) in the directory AA are inserted one by one into an index list is shown in FIG. 7. Next, cells in the directory BB are processed. The state where the cells (AND2, NOT, OR2, OR3,) in the directory BB are inserted one by one into the index list is shown in FIG. 8. Here, since the blocks named NOT and OR2 already exist in the list, insertion process is not executed on the list for these cell names. On the other hand, new blocks named are generated to have names AND2 and OR3, respectively, and are inserted in places where cell names thereof are arranged in alphabetical order, respectively.

Figure 9:
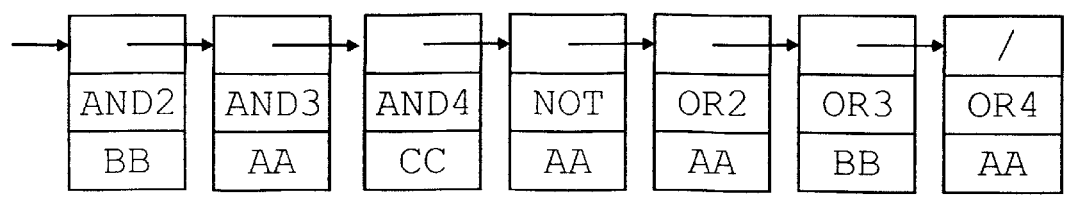
FIG. 9 shows the succeeding step of a generating process of an index list.

Finally, the processing is executed for the directory CC. The state where the cells (AND3, AND4, NOT, OR3) in the directory CC are inserted one by one in the index list is shown in FIG. 9. Here, since the blocks named AND3, NOT, and OR3 already exist in the list, the insertion process is not executed on the list for these cell names. Only one block is generated to have the name AND4, and is inserted in the place where the cell name thereof is located in alphabetical order. Thus, once, if an index list is completed, an index table can be easily generated by following the list from the top and by outputting the contents thereof one by one.

Figure 10:
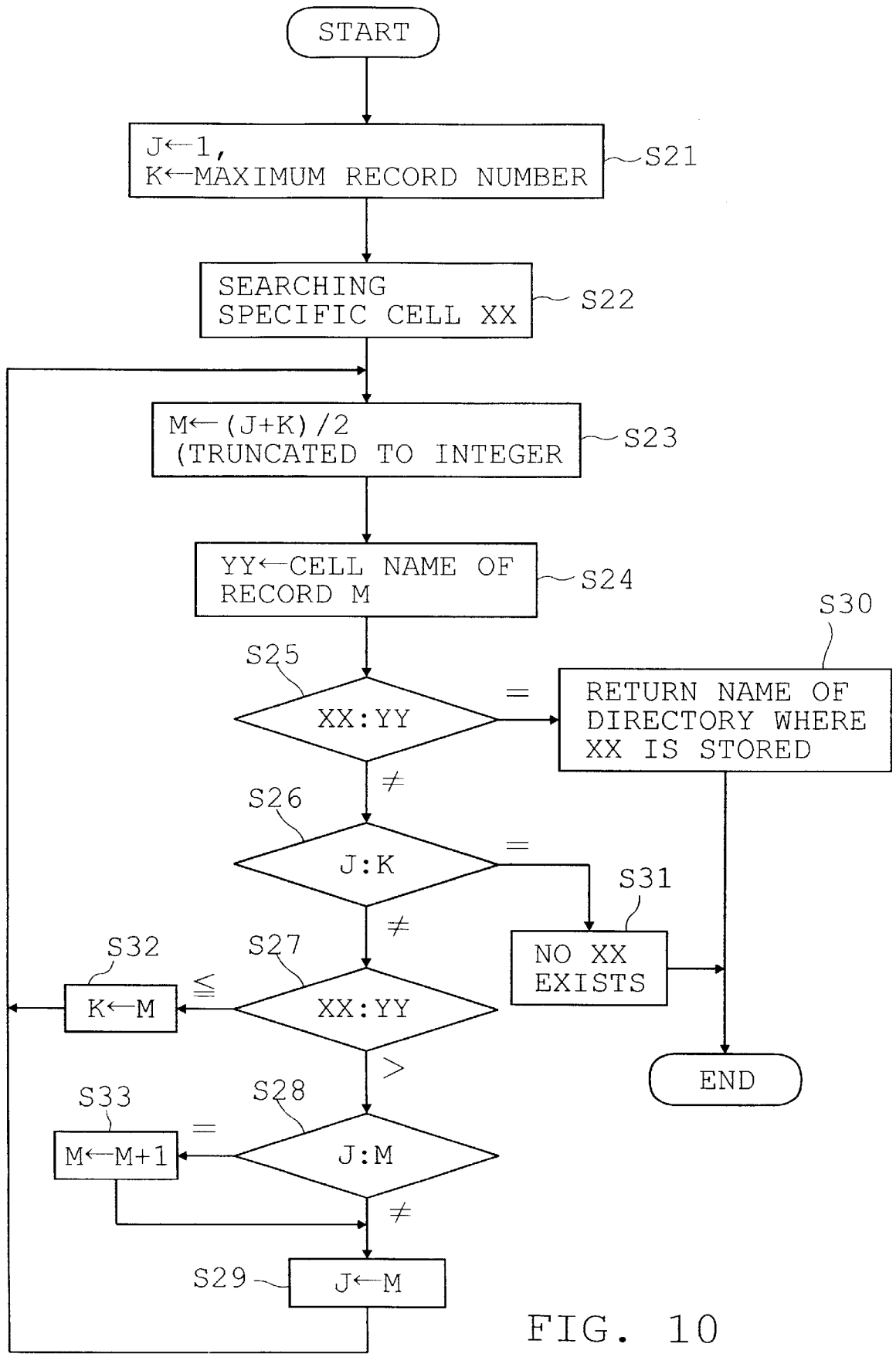
FIG. 10 is a flow chart that shows a process for searching an index table in the system in FIG. 2.

Next, searching processing of an index table will be explained. Since each record of the index table is arranged so that each cell name may be located in alphabetical order, in this case, searching processing may be executed with a binary search procedure as shown in FIG. 10. For example, when searching for a cell name OR3 from the index table of FIG. 3, first, it substitutes 1 for J, and it substitutes maximum record number=7 for K, respectively (S21), and it sets OR3, as a searched-for object XX (S22). Next, in order to start searching processing from the middle of the index table, it substitutes (1+7) and 2=4 for record number M to search (S23), and it substitutes the cell name NOT of record M (=4) for YY (S24). Here, if XX (=OR3) and YY (=NOT) are equal, it ends searching processing (S30). In this case, since XX and YY are not equal (S25), it compares J and K (S26). This means that the searching processing would be completed if J and K were equal, because there would remain no object to search for (S31). However, since both are not equal, it determines the relationship in size between XX and YY (S27). It substitutes M for K and it will return to step S23 in order to search the first half of the index table further if the determination shows XX≦YY (S32). Since it shows OR3>NOT, it compares J (=1) and M (=4) (S28). If both are equal, in order to compare with the next record, M is incremented by one (S33) and it substitutes M for J. However, since they are not equal, it substitutes the value (=4) of M for J (S29).

Next, it substitutes truncated (4+7)/2=5 for M (S23), and it substitutes cell name OR2 of record M (=5) for YY (S24). Since XX (=OR3) and YY (=OR2) are not equal (S25), it compares J with K (S26). Since they are not equal, the relationship in size between XX and YY (S27) is determined. In this case, they are OR3>OR2, it compares J (=4) with M (=5) (S28). Since they are not equal, it substitutes the value (=5) of M for J (S29).

Next, it substitutes (5+7)/2=6 for M (S23), and it substitutes cell name OR3 of record M (=6)for YY (S24). Since XX (=OR3) and YY (=OR3) are equal (S25), it refers to the index table to acquire the directory name (=BB) in which XX (=OR3) is stored, and it returns the obtained result to the system (S30).

The above-mentioned binary search method has an advantage in that the search time is relatively short compared to a method in which searching processing starts from the top of the index table, since the former narrows down the area where a searched for object exists, step by step, from the middle of the index table. However, it is necessary that the index table be prearranged in alphabetical order.

The invention may embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for selectively fetching a piece of reference information that is stored in a storage location with a highest priority that is determined beforehand if plural pieces of reference information that have an identical name exist, wherein said plural pieces of reference information are classified and stored in a plurality of different storage locations, the method comprising:

generating an index table that indicates a relationship between each name of said plural pieces of reference information and a storage location with a highest priority that is determined beforehand from among a plurality of different storage locations for said plural pieces of reference information that have a same name;

searching for a storage location of a piece of reference information that should be fetched in said index table; and fetching said piece of reference information at a found storage location according to said search.

2. The method according to claim 1, wherein said step of generating an index table includes generating an index list which comprises a plurality of blocks having a pointer for a succeeding block, a name of a piece of reference information, and a storage location of said piece of reference information using a priority table which represents a priority order of said plurality of different storage locations for said plural pieces of reference information that have a same name.

3. The method according to claim 2, wherein said index list is generated by inserting a block which does not exist in the index list thereto by processing a plurality of storage locations in the order of said priority order in said priority table.

4. The method according to claim 1, wherein said step of searching for a storage location includes narrowing an area to search by making said index table according to an order that is associated with each name of said plural pieces of reference information.

5. An apparatus for selectively fetching a piece of reference information that is stored in a storage location with a highest priority that is determined beforehand if plural pieces of reference information that have an identical name exist, wherein said plural pieces of reference information are classified and stored in a plurality of different storage locations, the apparatus comprising:

a generating portion for generating an index table that indicates a relationship between each name of said plural pieces of reference information and a storage location with a highest priority that is determined beforehand from among a plurality of different storage locations for said plural pieces of reference information that have a same name;

a searching portion for searching for a storage location of a piece of reference information that should be fetched in said index table; and a fetching portion for fetching said piece of reference information at a found storage location according to said search.

6. An apparatus for selectively fetching a piece of reference information that is stored in a storage location with a highest priority that is determined beforehand if plural pieces of reference information that have an identical name exist, wherein said plural pieces of reference information are classified and stored in a plurality of different storage locations, the apparatus comprising:

means for generating an index table that indicates a relationship between each name of said plural pieces of reference information and a storage location with a highest priority that is determined beforehand from among a plurality of different storage locations for said plural pieces of reference information that have a same name;

means for searching for a storage location of a piece of reference information that should be fetched in said index table; and means for fetching said piece of reference information at a found storage location according to said search.

* * * * *